Patented July 6, 1954

2,683,170

UNITED STATES PATENT OFFICE 2,683,170

PHOSPHORUS DERIVATIVES OF THIOSEMI-CARBAZONES AND PROCESSES OF MAKING SAME

Hans Schmidt, Wuppertal-Vohwinkel, Germany, assignor to Schenley Industries, Inc., New York, N. Y., a corporation of Delaware No Drawing. Application February 2, 1950, Serial No. 142,073

Claims priority, application Germany February 8, 1949

13 Claims. (Cl. 260—552)

This invention relates to pharmaceutical preparations and has for an object the production of therapeutically useful products and the provision of an improved method or process for producing therapeutically useful products.

I have discovered that halogen compounds of phosphoric acids and thiophosphoric acids (such, for example, as chlorides of the types of $PCl_5$, $POCl_3$, $PSCl_3$ and corresponding bromides) react with thiosemicarbazones to form phosphorus-containing compounds, and that the resultant reaction products are valuable for therapeutic purposes, particularly for the treatment of tuberculosis. The reaction can be carried out especially advantageously in the presence of tertiary bases, such, for example, as pyridine, dimethylaniline. It is recommended that the reaction products be treated with water in order to effect replacement by hydroxyl groups of the halogen atoms bonded to the phosphorus (which atoms remain in place during the reaction).

The mechanism of the reaction is not known specifically. Since, however, even those thiosemicarbazones that have no free hydroxyl or amino groups apparently are susceptible of conversion in accordance with mechanisms or reactions and with the production of reaction products similar to those described above, it can be assumed logically that an addition takes place on the C=N bond. This type of reaction probably also characterizes those cases involving binding of the phosphoric acid residue in which thiosemicarbazones with hydroxyl or amino groups are used as starting products.

The phosphorus content of the reaction products is subject to variations. The compounds thus obtainable are for the most part soluble in alkalies. In a great many cases, the alkali salts can be isolated in solid form. The new compounds are capable of further transformations.

Example No. 1

Twenty-four (24) grams of 4-acetylaminobenzalthiosemicarbazone is dissolved in 300 cc. of anhydrous pyridine by moderate heating, and the solution is slowly added, after cooling, to a solution of twenty-one (21) grams of phosphorus pentachloride in 130 cc. of anhydrous pyridine, while agitating. Under spontaneous heating to about 50° C., a slight precipitation occurs. This can be followed by heating on a water bath for approximately 30 minutes. After cooling, the material is stirred with a large amount of water. The undissolved portion is strained through a suction filter, washed out with water, and subsequently dissolved by stirring with dilute caustic soda solution. It is then filtered and precipitated again by means of dilute acetic acid. The voluminous, gelatinous precipitate is suction-strained and washed well with water. When dry, the compound forms about eighteen (18) grams of a dark-red powder, melting at about 210° C., and contains approximately 1 mol of phosphorus to 2 mols of the thiosemicarbazone. A soluble sodium salt can be produced by dissolution in dilute caustic soda solution and precipitation with alcohol.

In analogous fashion 4-acetylaminobenzalthiosemicarbazone may be treated with phosphorus oxychloride ($POCl_3$, phosphorylchloride) or phosphorus sulfochloride, for example. On the other hand, other thiosemicarbazones, such as benzalthiosemicarbazone or 4-anisalthiosemicarbazone, can be subjected to treatment with phosphorus pentachloride. The action of phosphorus pentabromide may be utilized analogously.

Example No. 2

Nineteen and one-half (19.5) grams of 4-aminobenzalthiosemicarbazone are dissolved in 200 cc. of anhydrous pyridine, and, while shaking, the solution is added to a solution of 21 grams of phosphorus pentachloride in 130 cc. of pyridine. While heat evolves, a voluminous precipitate forms, which is passed through a suction filter after cooling and is washed with pyridine. Hereafter, it is stirred with water for some time, strained by suction, and washed out with water. It is finally dissolved in dilute caustic soda solution with moderate heating, and filtered. Addition of acetic acid results in separation of a voluminous precipitate, which is sucked off and washed out. It dries to reddish, hard crusts which may be washed with acetone after pulverization. Yield: about 23 grams. Dissolution with dilute caustic soda solution and precipitation with alcohol yield a water-soluble sodium salt of the resultant phosphorus compound of the thiosemicarbazone.

Example No. 3

Thirty-four (34) grams of 4-aminobenzalthiosemicarbazone are dissolved in 160 cc. of anhydrous pyridine in a beaker of 2 liter capacity and, while shaking, a cooled solution of 4 cc. of phosphorus oxychloride in 60 cc. of pyridine is slowly added. The attendant self-heating should not be allowed to exceed 40° C.

Toward the end of the addition a red, viscous mass precipitates. After standing for some time the beaker is almost entirely filled with water, followed by stirring for several hours. The precipitate is filtered by suction, washed with water, and stirred up with acetone after drying, causing dissolution of any starting material that may still be present. After standing for several hours, the product is strained by suction and is washed out with acetone. Drying yields a brownish powder which, after sintering, melts at about 190° C. with gas development. The product is soluble in dilute caustic esoda solution. It contains about 1 mol phosphorus to 3 mols thiosemicarbazone. The conversion may also be effected in other proportions, e. g. with 6 or 8 cc. of phosphorus oxychloride. Phosphorus oxybromide may be utilized in analogous fashion.

*Example No. 4*

Nineteen and one-half (19.5) grams of 4-aminobenzalthiosemicarbazone are dissolved in 100 cc. of pyridine and a solution of five and eight-tenths (5.8) grams of phosphorus sulfochloride in 40 cc. of pyridine is added. By appropriate cooling the spontaneous rise in temperature is prevented from exceeding 40–50° C. After cooling, the material is stirred into strongly diluted, ice-cooled hydrochloric acid, and the precipitated substance is sucked off. After drying it is treated with acetone. A reddish powder containing phosphorus is obtained.

*Example No. 5*

Nineteen and one-half (19.5) grams of 3-hydroxybenzalthiosemicarbazone are dissolved in 200 cc. of anhydrous pyridine, and this solution is added to twenty-one (21) grams of phosphorus pentachloride in 130 cc. of pyridine. Attended by self-heating, a voluminous precipitate is formed which is suction-strained after cooling and washed out with pyridine. It is then stirred with water for a while, passed through the suction filter, and dissolved in dilute caustic soda solution, possibly with moderate heating. It is subsequently filtered and reprecipitated with acetic acid. After sucking off, washing, and drying, a slightly colored powder is obtained. This is converted into a readily soluble sodium salt by dissolution in dilute caustic soda solution and precipitation with alcohol.

4-hydroxybenzalthiosemicarbazone, for example, may be used as starting material in the same manner.

*Example No. 6*

Twenty-seven (27) grams of 4-dihydroxypropyl-1-oxybenzalthiosemicarbazone is dissolved in 90 cc. of anhydrous pyridine and, while stirring, a solution of 9 cc. of phosphorus oxychloride in 25 cc. of pyridine is instilled therein, with the temperature being held below 25° C. by means of cooling. The supernatant pyridine is then poured off the solid cake which has formed. The latter is dissolved in methanol under heat, and the filtered solution is evaporated. It is dissolved in dilute caustic soda solution until the neutral point is reached and is then filtered. The sodium salt thus formed is precipitated by stirring in alcohol. The salt obtained contains phosphorus and is readily soluble in water.

*Example No. 7*

Fifteen (15) cc. of phosphorus oxychloride are added to 100 cc. of pyridine; this is cooled off and, while agitating, a solution of nineteen (19) grams of 4-aminobenzalthiosemicarbazone in 80 cc. of pyridine is added. While heating spontaneously, the material solidifies to the consistency of jelly. When the reaction is terminated, methanol is added, followed by stirring for some time. The resultant granular precipitate is strained through a suction filter and washed with methanol. A slightly reddish, phosphorus-containing product is obtained, which is soluble in caustic soda solution.

*Example No. 8*

Nineteen and one-half (19.5) grams of 4-hydroxybenzalthiosemicarbazone are dissolved in 80 cc. of pyridine, and this solution is added, with shaking, to a solution of 15 cc. of phosphorus oxychloride in 100 cc. of pyridine. Considerable self-heating ensues. The reaction liquid soon solidifies in gelatinous consistency. After standing for some time it is stirred up with methanol and washed out well. The phosphorus derivative of the thiosemicarbazone is obtained in the form of a yellow, moderately water-soluble powder which dissolves easily in caustic soda solution.

I claim:

1. Process for making therapeutically useful products that comprises reacting a thiosemicarbazone selected from the class consisting of benzalthiosemicarbazone, 4-acetylamino- benzalthiosemicarbazone, 4-methoxy-benzalthiosemicarbazone, 4-amino-benzalthiosemicarbazone, 3-hydroxy-benzalthiosemicarbazone, 4-hydroxy-benzalthiosemicarbazone, and 4-dihydroxypropyl-1-oxy-benzalthiosemicarbazone with a halogen-containing inorganic compound of phosphorus selected from the class consisting of phosphorus pentachloride, phosphorus pentabromide, phosphorus oxychloride, and phosphorus sulfochloride in the presence of a tertiary amine solvent and hydrolyzing the reaction product with water to remove halogen attached to phosphorus.

2. The process of claim 1 wherein the tertiary amine solvent is pyridine.

3. The process of claim 1 wherein the thiosemicarbazone is acetylamino-benzalthiosemicarbazone and the halogen-containing inorganic compound of phosphorus is phosphorus pentachloride.

4. The process of claim 1 wherein the thiosemicarbazone is 4-amino-benzalthiosemicarbazone and the halogen-containing inorganic compound of phosphorus is phosphorus pentachloride.

5. The process of claim 1 wherein the thiosemicarbazone is 4-amino-benzalthiosemicarbazone and the halogen-containing inorganic compound of phosphorus is phosphorus oxychloride.

6. The process of claim 1 wherein the thiosemicarbazone is 4-amino-benzalthiosemicarbazone and the halogen-containing inorganic compound of phosphorus is phosphorus sulfochloride.

7. The process of claim 1 wherein the thiosemicarbazone is 3-hydroxy-benzalthiosemicarbazone and the halogen-containing inorganic compound of phosphorus is phosphorus pentachloride.

8. A therapeutically useful substance consisting of the reaction product of a thiosemicarbazone selected from the class consisting of benzalthiosemicarbazone, 4 - acetylamino - benzalthiosemicarbazone, 4 - methoxy - benzalthiosemicarbazone, 4 - amino - benzalthiosemicarbazone, 3-hydroxy - benzalthiosemicarbazone, 4 - hydroxybenzalthiosemicarbazone, and 4-dihydroxypropyl-1-oxy-benzalthiosemicarbazone and a halogen-containing inorganic compound of phosphorus selected from the class consisting of phosphorus pentachloride, phosphorus pentabromide, phosphorus oxychloride, and phosphorus sulfochloride which have been reacted in the presence of a tertiary amine solvent and the reaction product hydrolyzed with water.

9. The therapeutically useful substance of claim 8 wherein the thiosemicarbazone is acetylamino-benzalthiosemicarbazone and the halogen-containing inorganic compound of phosphorus is phosphorus pentachloride.

10. The therapeutically useful substance of claim 8 wherein the thiosemicarbazone is 4-amino-benzalthiosemicarbazone and the halogen-containing inorganic compound of phosphorus is phosphorus pentachloride.

11. The therapeutically useful substance of claim 8 wherein the thiosemicarbazone is 4-amino-benzalthiosemicarbazone and the halogen-containing inorganic compound of phosphorus is phosphorus oxychloride.

12. The therapeutically useful substance of claim 8 wherein the thiosemicarbazone is 4-amino-benzalthiosemicarbazone and the halogen-containing inorganic compound of phosphorus is phosphorus sulfochloride.

13. The therapeutically useful substance of claim 8 wherein the thiosemicarbazone is 3-hydroxy-benzalthiosemicarbazone and the halogen-containing inorganic compound of phosphorus is phosphorus pentachloride.

No references cited.